United States Patent
Fujimoto

(10) Patent No.: US 6,694,962 B2
(45) Date of Patent: Feb. 24, 2004

(54) ABNORMALITY DIAGNOSIS APPARATUS OF INTERNAL COMBUSTION ENGINE

(75) Inventor: Shinya Fujimoto, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 21 days.

(21) Appl. No.: 10/136,402

(22) Filed: May 2, 2002

(65) Prior Publication Data
US 2003/0079730 A1 May 1, 2003

(30) Foreign Application Priority Data
Oct. 26, 2001 (JP) ........................................ 2001-328890

(51) Int. Cl.$^7$ .............................................. F02D 41/22
(52) U.S. Cl. ........................ 123/688; 123/690; 60/277
(58) Field of Search ............................ 123/198 D, 688, 123/494, 690, 703, 704; 701/109, 103; 60/276, 277; 73/117.2, 119 A

(56) References Cited

U.S. PATENT DOCUMENTS

| | | | | |
|---|---|---|---|---|
| 5,181,499 A | * | 1/1993 | Kayanuma | 123/690 |
| 5,213,088 A | * | 5/1993 | Harada | 123/674 |
| 6,032,659 A | * | 3/2000 | Yamashita et al. | 123/674 |
| 6,109,244 A | * | 8/2000 | Yamamoto et al. | 123/478 |
| 6,431,160 B1 | * | 8/2002 | Sugiyama et al. | 123/674 |

FOREIGN PATENT DOCUMENTS

| | | | | |
|---|---|---|---|---|
| JP | 126047 | * | 7/1984 | F02D/33/00 |
| JP | 63-219848 | | 9/1988 | |
| JP | 2-11840 | | 1/1990 | |
| JP | 23336 | * | 1/1991 | F02D/41/22 |
| JP | 246342 | * | 11/1991 | F02D/41/22 |
| JP | 4-269350 | | 9/1992 | |
| JP | 6-17692 | | 1/1994 | |
| JP | 338288 | * | 12/1996 | F02D/41/14 |
| JP | 213398 | * | 8/2000 | F02D/41/22 |
| JP | 274296 | * | 10/2000 | F02D/41/22 |

* cited by examiner

Primary Examiner—Gimie Mahmoud
Assistant Examiner—Hai Huynh
(74) Attorney, Agent, or Firm—Sughrue Mion, PLLC

(57) ABSTRACT

The abnormality diagnosis apparatus includes an oxygen sensor for detecting a concentration of oxygen in exhaust gases of an internal combustion engine, an injector for injecting fuel into the internal combustion engine, a feedback control element for driving the injector according to the concentration of oxygen to control an amount of fuel supplied to the internal combustion engine in a feedback manner, a forced fuel correction element for correcting an amount of fuel controlled by the feedback control element in a forced manner, and an abnormality determination element for determining the presence or absence of abnormality in the injector. The abnormality determination element determines the presence or absence of abnormality in the injector based on the concentration of oxygen detected by the oxygen sensor in the course of a forced fuel correction control operation carried out by the forced fuel correction element.

4 Claims, 5 Drawing Sheets

ABNORMALITY DIAGNOSIS APPARATUS OF INTERNAL COMBUSTION ENGINE

This application is based on Application No. 2001-328890, filed in Japan on Oct. 26, 2001, the contents of which are hereby incorporated by reference.

BACKGROUND OF THE INVENTION

1. Field of the Invention

The present invention relates to an abnormality diagnosis apparatus of an internal combustion engine for determining abnormality in a fuel system (e.g., injector(s)) used in a vehicle engine and so on, and more particularly, to such an abnormality diagnosis apparatus of an internal combustion engine which is capable of improving reliability in the abnormality determination as well as making abnormality determination at high frequencies.

2. Description of the Prior Art

In general, in a control system for an internal combustion engine, in order to perform feedback control on the amount of fuel injected from each injector in accordance with the operating condition of the engine, an oxygen sensor is provided on an exhaust pipe for detecting the concentration of oxygen in exhaust gases flowing therethrough so that the amount of fuel to be injected from each injector can be controlled in a feedback manner in accordance with the oxygen concentration thus detected.

In addition, during the operation of the internal combustion engine, it is necessary to diagnose the functionality of the fuel system including the injectors or the oxygen sensor so as to maintain the feedback control on the amount of fuel supplied to the internal combustion engine in a reliable manner.

In these circumstances, there have been conventionally proposed a variety of abnormality diagnosis apparatuses for determining the presence or absence of abnormality in a fuel system or an oxygen sensor in an internal combustion engine.

For instance, as a first prior art example, Japanese Patent Application Laid-Open No. 4-269350 or Japanese Patent Application Laid-Open No. 6-17692 describes an apparatus for determining abnormality in a fuel system for a part of engine cylinders based on the state of an output signal from an oxygen sensor.

However, since in the above-mentioned first prior art example, the feedback condition based on the detection signal of the oxygen sensor is not specified, there would be a fear that when the detection signal of the oxygen sensor is varied by external disturbances (changes in load or in the number of revolutions per minute of the engine, etc.) other than abnormality in the fuel system, it might be determined by mistake that there has taken place abnormality.

Moreover, as a second prior art example, Japanese Patent Application Laid-Open No. 2-11840 describes an apparatus for determining abnormality in an oxygen sensor based on the state of a signal from the oxygen sensor representative of the concentration of oxygen detected in the course of a forced fuel correction control operation.

However, in this second prior art example, abnormality determination for the oxygen sensor is made only during the forced fuel correction control operation, and hence it is impossible to carry out oxygen sensor abnormality determination with high frequencies or highly frequently.

Additionally, as a third prior art example, Japanese Patent Application Laid-Open No. 63-219848 describes an apparatus for determining abnormality in a fuel system by using the amount of fuel controlled in a feedback manner based on a detection signal (oxygen concentration) of an oxygen sensor and the amount of control learned for the feedback-controlled fuel amount.

However, in the third prior art example, it is only possible to detect abnormality in the entire fuel system, but not to detect abnormality in a part of the fuel system for respective engine cylinders.

As described above, the prior art abnormality diagnosis apparatuses have the following problems. That is, in the first prior art example, when the detection signal of the oxygen sensor is disordered by external disturbances other than abnormality in the fuel system, it might mistakenly be determined that the oxygen sensor is abnormal.

In addition, in the second prior art example, it is impossible to detect abnormality in the oxygen sensor with high frequencies or highly frequently.

Moreover, in the third prior art example, it is impossible to detect abnormality in the fuel system for a part of cylinders.

SUMMARY OF THE INVENTION

The present invention is intended to obviate the various problems as referred to above, and has for its object to provide an abnormality diagnosis apparatus of an internal combustion engine which is capable of improving reliability in abnormality determination as well as making abnormality determination at high frequencies or highly frequently.

Bearing the above object in mind, according to the present invention, there is provided an abnormality diagnosis apparatus of an internal combustion engine including: an oxygen sensor for detecting a concentration of oxygen in exhaust gases of an internal combustion engine; an injector for injecting fuel into the internal combustion engine; a feedback control element for driving the injector according to the concentration of oxygen to control an amount of fuel supplied to the internal combustion engine in a feedback manner; a forced fuel correction element for correcting an amount of fuel controlled by the feedback control element in a forced manner; and an abnormality determination element for determining the presence or absence of abnormality in the injector. The abnormality determination element determines the presence or absence of abnormality in the injector based on the concentration of oxygen detected by the oxygen sensor in the course of a forced fuel correction control operation carried out by the forced fuel correction element.

In a preferred form of the present invention, the forced fuel correction element carries out the forced fuel correction control on the amount of control fuel when the operating condition of the internal combustion engine is in a stable state.

In another preferred form of the present invention, before determining the presence or absence of abnormality in the injector, the abnormality determination element determines the presence or absence of abnormality in the oxygen sensor based on the concentration of oxygen detected by the oxygen sensor in the course of the forced fuel correction control operation carried out by the forced fuel correction element, and further determines the presence or absence of abnormality in the injector only when the oxygen sensor is not abnormal.

In a further preferred form of the present invention, the abnormality determination element is provided with warning information element and drives the warning information element when it is determined that the oxygen sensor or the injector is abnormal.

In a still further preferred embodiment of the present invention, when the amount of fuel controlled by the feedback control element varies from a reference value by a prescribed value or more, the abnormality determination element determines that the amount of control fuel is abnormal, and further determines that the fuel system including the injector is abnormal when it is determined that at least one of the injector and the amount of control fuel is abnormal.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.
Embodiment 1.

Figure 1:
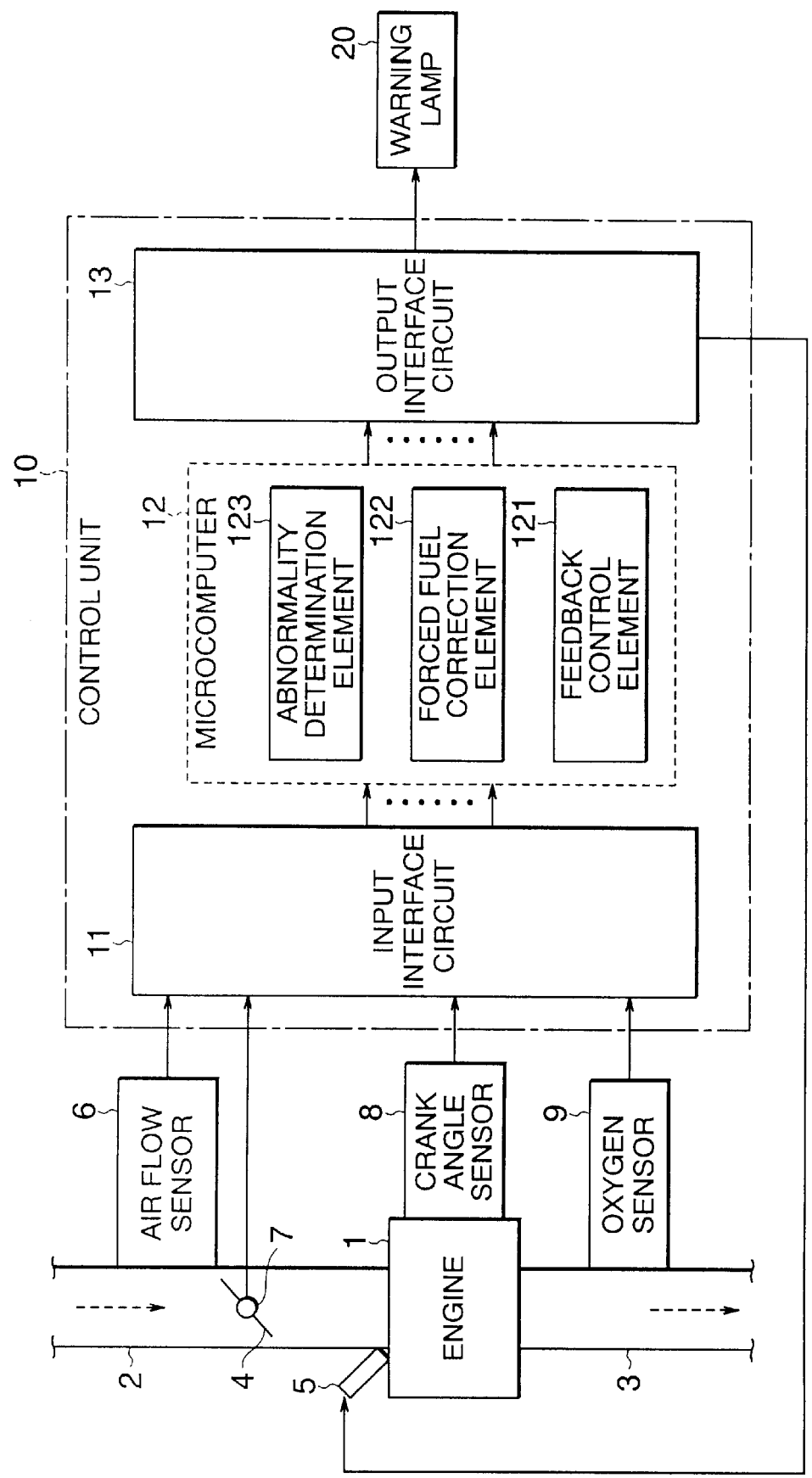
FIG. 1 is a block diagram illustrating the construction of an abnormality diagnosis apparatus of an internal combustion engine according to a first embodiment of the present invention.

FIG. 1 is a block diagram in which a first embodiment of the present invention is shown.

In FIG. 1, an intake pipe 2 and an exhaust pipe 3 are connected with an internal combustion engine 1 (hereinafter simply referred to as an engine).

A throttle valve 4 is arranged in the intake pipe 2 for adjusting the amount of intake air supplied to the engine 1.

In addition, injectors 5 each supplying fuel to a corresponding set of cylinders are provided at an air introduction portion or intake manifold through which air is introduced from the intake pipe 2 into the engine 1. Here, note that only one injector 5 is shown to avoid the complexity in the drawings.

Moreover, an air flow sensor 6 for detecting the amount of intake air is provided on the intake pipe 2 on the upstream side of the throttle valve 4, and a throtle opening sensor 7 for detecting the degree of opening of the throttle valve 4 (hereinafter referred to as throttle opening) is mounted on the throttle valve 4.

The air flow sensor 6 outputs a number of pulses corresponding to the amount of intake air introduced into the engine 1.

In addition, a crank angle sensor 8 for detecting a reference rotational position of the engine 1 (i.e., a prescribed rotational angle or position of a crankshaft) is mounted on an rotation shaft (i.e., crankshaft) of the engine 1, and an oxygen sensor 9 for detecting the concentration of oxygen (corresponding to an air fuel ratio) in exhaust gases is provided in the exhaust pipe 3.

The crank angle sensor 8 outputs the number of pulses corresponding to the number of revolutions per minute of the engine 1.

The air flow sensor 6, the throttle opening sensor 7, the crank angle sensor 8 and the oxygen sensor 9 together constitute a variety of kinds of sensors for detecting the operating condition of the engine 1. Other sensors not illustrated in the drawings include a pressure sensor for detecting the internal pressure in the intake pipe 2, a temperature sensor for detecting the temperature of engine coolant or cooling water for cooling the engine 1, and so on.

The detection signals of the various sensors are input to an electronic control unit 10 at prescribed crank angles, respectively.

The electronic control unit 10 is provided with an input interface circuit 11 for receiving the detection signals from the various sensors 6–9, a microcomputer 12 for processing a variety of kinds of input information, and an output interface circuit 13 for outputting various control signals based on the operational processing of the microcomputer 12.

The microcomputer 12 is provided with a feedback control element 121 for controlling the amounts of fuel to be injected from the injectors 5 to the unillustrated intake manifold in a feedback manner, a forced fuel correction element 122 for forcedly correcting the amounts of fuel to be injected from the injectors 5, and an abnormality determination element 123 for determining the presence or absence of abnormality at least in the injectors 5.

The feedback control element 121 controls the amount of fuel supplied to the engine 1 in a feedback manner by controlling the driving time of each injector 5 in accordance with the concentration of oxygen detected by the oxygen sensor 9.

When it is determined that there is abnormality in any of the injectors 5, the forced fuel correction element 122 forcedly corrects the amounts of control fuel which are injected from the injectors 5 and controlled by the feedback control element 121.

The abnormality determination element 123 determines the presence or absence of abnormality in the injectors 5 based on the concentration of oxygen detected by the oxygen sensor 9 in the course of a forced fuel correction control operation performed by the forced fuel correction element 122.

A warning light 20 is connected to the electronic control unit 10 so that it is driven to be illuminated to generate a warning indicative of the occurrence of abnormality when the abnormality determination element 123 in the microcomputer 12 determines the presence of abnormality in the injectors 5 (fuel system).

Now, a concrete processing operation of the control unit 10 according to the first embodiment of the present invention as illustrated in FIG. 1 will be described while referring to flow charts of FIG. 2 and FIG. 3.

Figure 2:
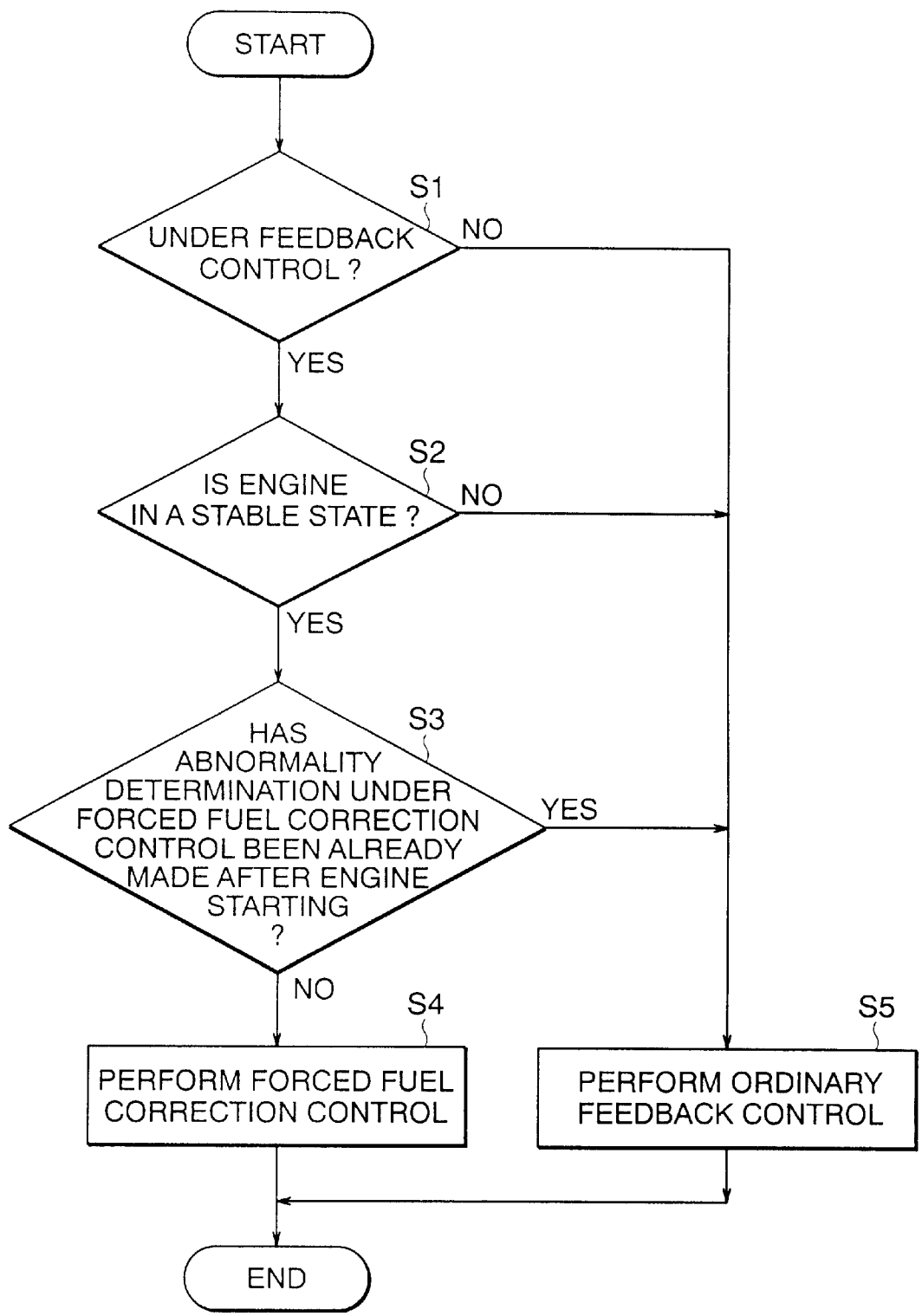
FIG. 2 is a flow chart illustrating a processing operation of the abnormality diagnosis apparatus according to the first embodiment of the present invention.

FIG. 2 shows a processing routine for carrying out the forced fuel correction control, which is performed by the forced fuel correction element 122 in the microcomputer 12 until abnormality determination has been finished after starting of the engine 1.

Figure 3:
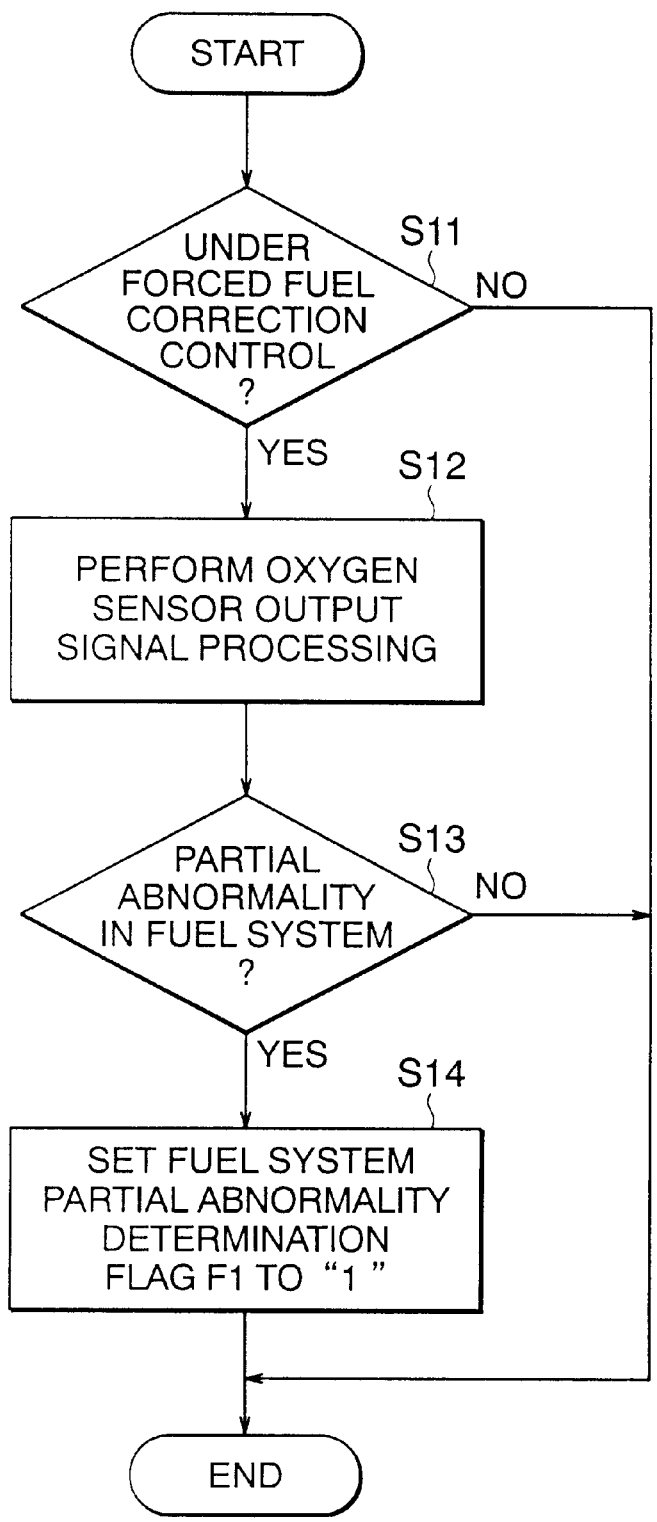
FIG. 3 is a flow chart illustrating another processing operation of the abnormality diagnosis apparatus according to the first embodiment of the present invention.

FIG. 3 shows a processing routine for determining partial abnormality in the injectors 5 (fuel system), which is executed by the abnormality determination element 123 in the microcomputer 12 during the forced fuel correction control.

Here, it is assumed that the abnormality determination element 123 determines the abnormal state of an injector 5 for a part of the plurality of cylinders as partial abnormality in the fuel system.

In FIG. 2, at first, the forced fuel correction element 122 determines whether the amount of fuel supplied to the engine 1 is in a state of being controlled in a feedback manner (step S1).

When it is determined in step S1 that the fuel system is under feedback control, a determination is then made as to whether the engine operating condition is in a stable state (step S2).

When it is determined in step S2 that the engine 1 is in a stable state (that is, YES), a determination is further made as to whether abnormality determination of the injectors 5 (fuel system) under the forced fuel correction control has been carried out after starting of the engine (step S3).

When it is determined in step S3 that the abnormality determination have not yet been carried out after the engine starting (that is, NO), the forced fuel correction control for abnormality determination is effected (step S4), and the processing routine of FIG. 2 is ended.

On the other hand, when it is determined in step S1 that the fuel system is not under feedback control (that is, NO), ordinary feedback control is carried out (step S5), and the processing routine of FIG. 2 is ended.

Moreover, when it is determined in step S2 that the operating condition of the engine 1 is not in a stable state (that is, NO), or when it is determined in step S3 that abnormality determination for the injectors 5 has already been carried out (that is, YES), the processing routine proceeds to the ordinary feedback control step S5.

Thus, when the operating condition of the engine 1 after starting thereof is under the fuel amount feedback control based on the detection signal (concentration of oxygen) from the oxygen sensor 9 and in a stable state, the forced fuel correction control is carried out only once by the forced fuel correction element 122, and thereafter the forced fuel correction control is continued until the abnormality determination for the fuel system is ended.

Subsequently, in FIG. 3, the abnormality determination element 123 first determines whether the engine 1 is under the forced fuel correction control performed by the forced fuel correction element 122 (step S11), and when it is determined that the engine 1 is not under the forced fuel correction control (that is, NO), the processing routine of FIG. 3 is ended at once.

On the other hand, when it is determined in step S11 that the engine 1 is under the forced fuel correction control (that is, YES), the output signal (concentration of oxygen) from the oxygen sensor 9 is processed so as to check the state of the oxygen concentration detected during the forced fuel correction control (step S12).

Here, note that the concrete signal processing in step S12 is described in the above-mentioned first prior art example (Japanese Patent Application Laid-Open No. 4-269350) for instance, and hence a detailed description thereof is omitted.

Thereafter, it is determined whether the fuel system is partially abnormal from the signal processing result carried out in step S12 (step S13), and when it is determined that the fuel system is not partially abnormal (that is, NO), the processing routine of FIG. 3 is ended at once.

On the other hand, when it is determined in step S13 that the fuel system is partially abnormal (that is, YES), a fuel system partial abnormality determination flag Fl is set to "1" in (step S14), and the processing routine of FIG. 3 is ended.

Hereafter, the abnormality determination element 123 drives the warning light 20 to warn the occurrence of abnormality, thereby enabling a prompt action to be taken for coping with the abnormal situation.

Thus, the forced fuel correction control is carried out by the forced fuel correction element 122 so that the concentration of oxygen detected by the oxygen sensor 9 during the forced fuel correction control is checked to determine whether the fuel system for a part of the cylinders is abnormal, as a result of which it is possible to make abnormality determination in an accurate manner even if there is a change in the engine load or the number of revolutions per minute of the engine 1 in the course of the feedback control operation performed by using the oxygen sensor 9.

In addition, abnormality determination is carried out in a stable operating state of the engine after starting thereof, abnormality in a part of the injectors 5 (fuel system) can be determined in a accurate manner with higher reliability.

Embodiment 2.

Although in the above-mentioned first embodiment, abnormality in the oxygen sensor 9 has not been taken into consideration, the presence or absence of abnormality in the oxygen sensor 9 may be determined before abnormality determination for a part of the fuel system has been made, and the above-mentioned abnormality determination processing for the fuel system may then be carried out after confirming that the oxygen sensor 9 is in a normal state.

Hereinafter, reference will be made to a second embodiment of the present invention in which a function of determining abnormality in the oxygen sensor 9 is added, while referring to a flow chart of FIG. 4.

Figure 4:
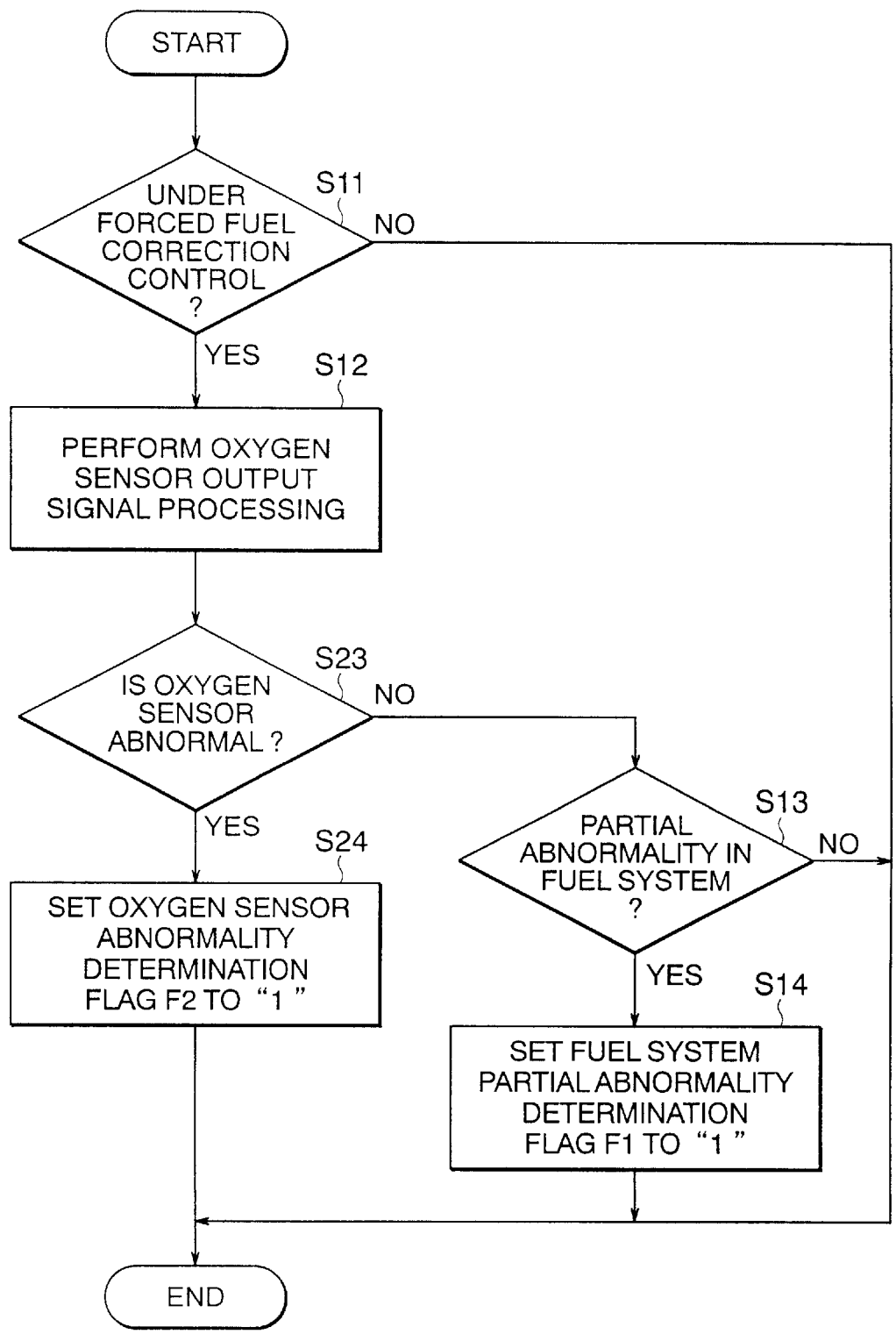
FIG. 4 is a flow chart illustrating the processing operation of an abnormality diagnosis apparatus of an internal combustion engine according to a second embodiment of the present invention.

In FIG. 4, the same or like processing steps as those described above (see FIG. 3) are identified by the same symbols while omitting a detailed description thereof.

In this case, after it has been determined that the engine is under the forced fuel correction control in step S11 and the processing of the output signal of the oxygen sensor 9 has been performed in step S12, the abnormality determination element 123 determines based on the signal processing result whether the oxygen sensor 9 is abnormal (i.e., the presence or absence of abnormality) (step S23).

Here, note that the concrete signal processing in steps S12 and S13 are described in the aforementioned second prior art example (Japanese Patent Application Laid-Open No. 2-11840) for instance, and hence a detailed description thereof is omitted.

When it is determined in step S23 that the oxygen sensor 9 is abnormal (that is, YES), an abnormality determination flag F2 of the oxygen sensor 9 is set to "1", and the processing routine of FIG. 4 is ended.

Accordingly, the fuel system partial abnormality determination processing (steps S13 and S14) is never performed when the oxygen sensor 9 is abnormal, and hence abnormality determination for the fuel system with low reliability at the time of abnormality in the oxygen sensor 9 is avoided.

On the other hand, when it is determined in step S23 that the oxygen sensor 9 is not abnormal but normal (that is, NO), the fuel system partial abnormality determination processing (steps S13 and S14) is carried out, and the processing routine of FIG. 4 is ended.

Hereafter, the abnormality determination element 123 drives the warning light 20 to warn the occurrence of abnormality in the oxygen sensor 9, thereby enabling a prompt action to be taken for coping with the abnormal situation.

At this time, for warning information about the abnormal state of the oxygen sensor 9, the warning light 20 may be driven in a form (for instance, the blinking cycle of the warning light 20 may be changed, or a separate lamp of a different color may be driven, etc.) different from the aforementioned case of warning abnormality in the fuel system.

Thus, before determining the presence or absence of abnormality in the injectors 5, the abnormality determination element 123 determines the presence or absence of abnormality in the oxygen sensor 9 based on the concentration of oxygen detected by the oxygen sensor 9 in the course of the forced fuel correction control performed by the forced fuel correction element 122, so that only when the oxygen sensor 9 is not abnormal (i.e., normal), a determination is made whether any of the injectors 5 is abnormal, thereby making it possible to further improve reliability in the fuel system partial abnormality determination.

In addition, the abnormality determination can be carried out in a reliable manner at higher frequencies by determining abnormality in the fuel system for a part of the cylinders simultaneously with the abnormality determination of the oxygen sensor 9.

Embodiment 3.

Although in the above-mentioned first embodiment, only abnormality in part of the injectors 5 (fuel system) has been determined under the fuel amount feedback control, abnormality determination in the fuel system may be made by taking a logical sum with the abnormality determination result of the fuel system based on the amount of feedback control (i.e., the amount of control fuel under feedback control).

Hereinbelow, reference will be made to a third embodiment of the present invention in which a fuel system abnormality determining function based on the amount of feedback control is added, while referring to a flow chart of FIG. 5.

In this case, when the amount of fuel controlled by the feedback control element 121 varies from a reference value by a prescribed value or more, the abnormality determination element 123 determines that the amount of control fuel is abnormal, and sets the fuel system abnormality determination flag Fb to "1".

Here, note that the fuel system abnormality determination processing based on the amount of feedback control is described in the aforementioned third prior art example (Japanese Patent Application Laid-Open No. 63-219848) for instance, and hence a detailed description thereof is omitted.

Figure 5:
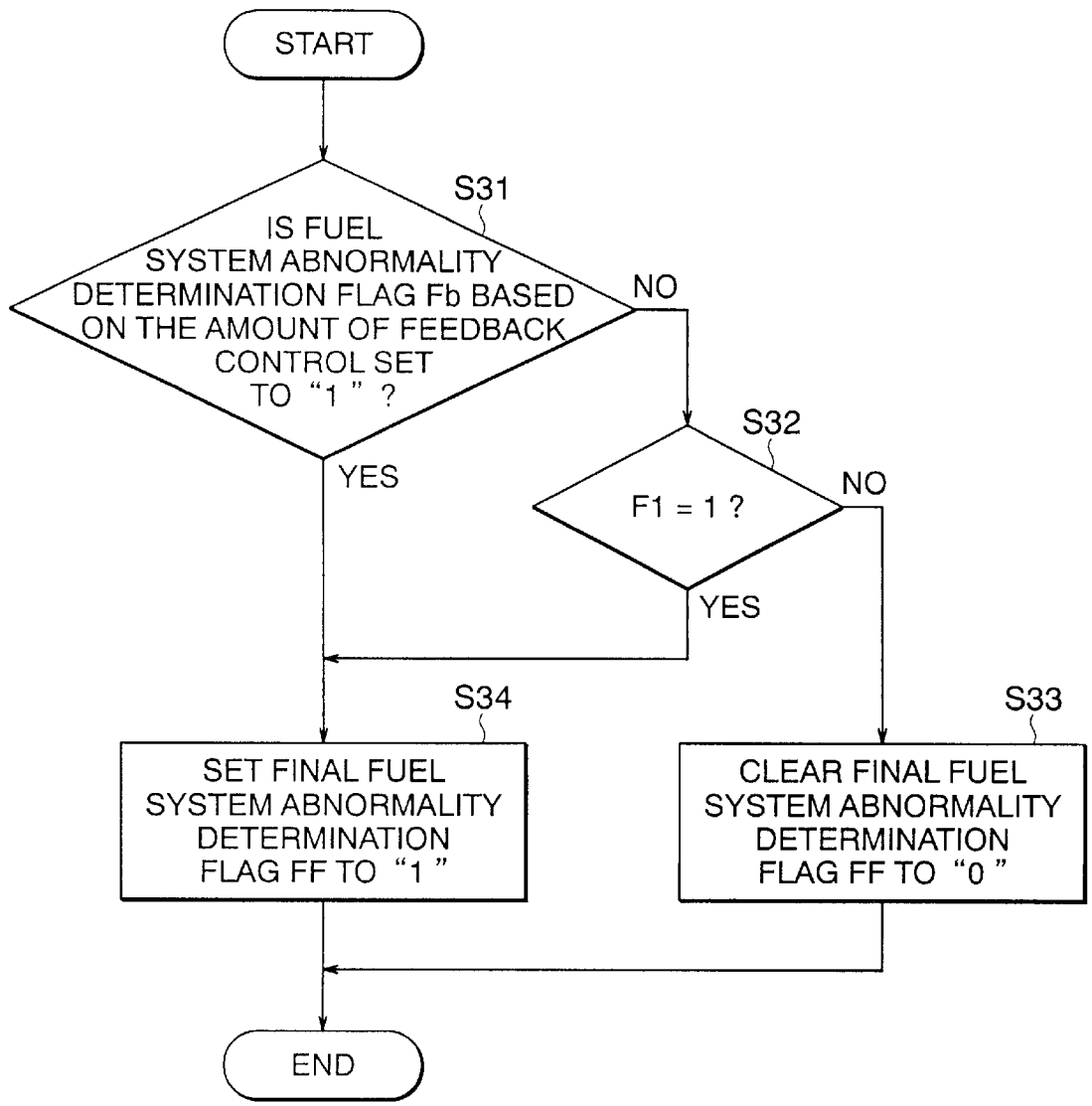
FIG. 5 is a flow chart illustrating the processing operation of an abnormality diagnosis apparatus of an internal combustion engine according to a third embodiment of the present invention.

In FIG. 5, the abnormality determination element 123 first determines whether the fuel system abnormality determination flag Fb based on the amount of feedback control is set to "1" (step S31).

When it is determined in step S31 that the fuel system abnormality determination flag Fb is equal to "0" (Fb=0) (that is, NO), it is then determined whether the fuel system partial abnormality determination flag Fl is set to "1" according to the above-mentioned step S14 (see FIG. 3 and FIG. 4) (step S32).

When it is determined in step S32 that the fuel system partial abnormality determination flag Fl is equal to "0" (Fl=0) (that is, NO), the fuel system is normal and hence a final fuel system abnormality determination flag FF is cleared to "0" (step S33), and the processing routine of FIG. 5 is ended.

On the other hand, when it is determined that the fuel system abnormality determination flag Fb is equal to "1" (Fb=1) in step S31 (that is, YES), the fuel system is regarded as abnormal, and the fuel system abnormality determination flag FF is set to "1" (step S34), and the processing routine of FIG. 5 is ended.

Additionally, when it is determined that the fuel system partial abnormality determination flag Fl is equal to "1" (Fl=1) in step S32 (that is, YES), the fuel system is similarly regarded as abnormal, and the processing routine proceeds to step S34.

Thus, when the amount of fuel controlled by the feedback control element 121 varies from the reference value by a prescribed value or more, the abnormality determination element 123 determines that the amount of control fuel is abnormal and sets the fuel system abnormality determination flag Fb to "1", whereas when it is determined that at least one of the injectors 5 and the amount of control fuel is abnormal, the abnormality determination element 123 determines that the fuel system including the injectors 5 is abnormal, and sets the fuel system abnormality determination flag FF to "1".

That is, the abnormality determination element 123 determines that the fuel system is abnormal, depending upon either one (logical sum) of the result of the fuel system abnormality determination according to the amount of feedback control and the result of the fuel system partial abnormality determination.

As a result, the abnormality determination can be carried out at higher frequencies or highly frequently.

Although in the foregoing embodiments, a plurality of injectors 5 have been employed, the present invention can of course be applied to the case in which a single injector is used for supplying fuel to a plurality of cylinders.

While the invention has been described in terms of preferred embodiments, those skilled in the art will recognize that the invention can be practiced with modifications or changes within the spirit and scope of the appended claims.

What is claimed is:

1. An abnormality diagnosis apparatus of an internal combustion engine, comprising:
   an oxygen sensor for detecting a concentration of oxygen in exhaust gases of said internal combustion engine, said internal combustion engine having a plurality of cylinders;
   a plurality of injectors each provided on a corresponding set of said cylinders, respectively, for injecting fuel into said internal combustion engine;
   a feedback control element for driving said injector according to said concentration of oxygen to control an amount of fuel supplied to said internal combustion engine in a feedback manner;
   a forced fuel correction element for correcting an amount of fuel controlled by said feedback control element in a forced manner; and
   an abnormality determination element for determining the presence or absence of abnormality in said injector;
   wherein said abnormality determination element determines the presence or absence of abnormality in said injector based on said concentration of oxygen detected by said oxygen sensor in the course of a forced fuel correction control operation carried out by said forced fuel correction element, and
   wherein before determining the presence or absence of abnormality in said injector, said abnormality determination element determines the presence or absence of abnormality in said oxygen sensor based on said concentration of oxygen detected by said oxygen sensor in the course of the forced fuel correction control operation carried out by said forced fuel correction element, and further determines the presence or absence of abnormality in said injector only when said oxygen sensor is not abnormal.

2. The abnormality diagnosis apparatus of an internal combustion engine according to claim 1, wherein said forced fuel correction element carries out the forced fuel correction control on said amount of control fuel when the operating condition of said internal combustion engine is in a stable state.

3. The abnormality diagnosis apparatus of an internal combustion engine according to claim 1, wherein said abnormality determination element is provided with warning information element and drives said warning information element when it is determined that said oxygen sensor or said injector is abnormal.

4. The abnormality diagnosis apparatus of an internal combustion engine according to claim 1, wherein when the amount of fuel controlled by said feedback control element varies from a reference value by a prescribed value or more, said abnormality determination element determines that said amount of control fuel is abnormal, and further determines that said fuel system including said injector is abnormal when it is determined that at least one of said injector and said amount of control fuel is abnormal.

* * * * *